A. H. FOWLER & E. J. MORGAN.
Said MORGAN assignor to said FOWLER.
Packing Deep Wells.
No. 8,491 Reissued Nov. 12, 1878.
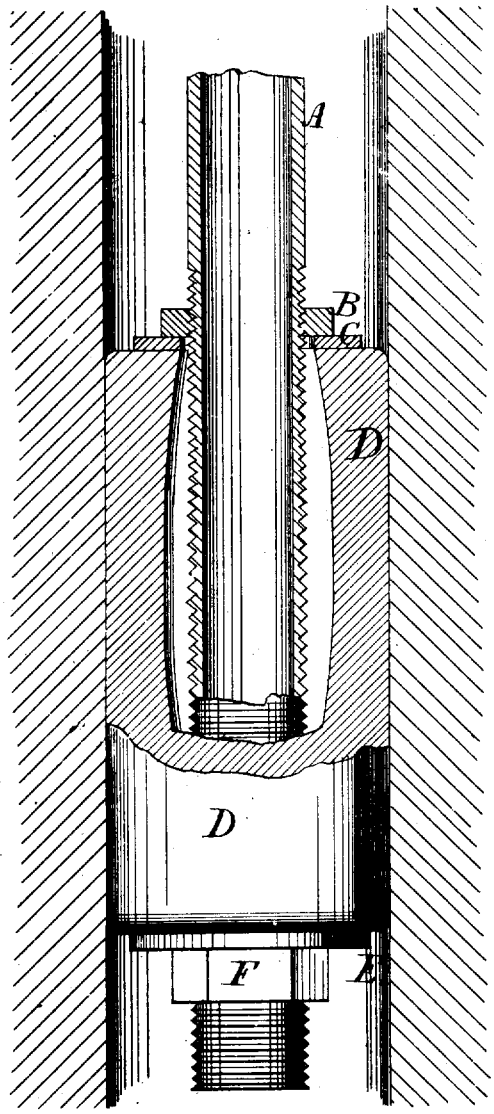
Witnesses:
F. M. Burnham
W. H. Bliss
Inventor
Alonzo H. Fowler
and
Edward J. Morgan
by H. A. Doubleday
their atty.

UNITED STATES PATENT OFFICE.

ALONZO H. FOWLER AND EDWARD J. MORGAN, OF ITHACA, NEW YORK; SAID MORGAN ASSIGNOR TO SAID FOWLER.

IMPROVEMENT IN PACKING DEEP WELLS.

Specification forming part of Letters Patent No. 51,167, dated November 28, 1865; Reissue No. 8,491, dated November 12, 1878; application filed May 17, 1878.

*To all whom it may concern:*

Be it known that we, ALONZO H. FOWLER and EDWARD J. MORGAN, both of Ithaca, in the county of Tompkins and State of New York, have invented certain new and useful Improvements in Packing Deep Wells; and we do hereby declare that the following is a full, clear, and exact description thereof, that will enable others skilled in the art to which it appertains to make and use the same, reference being had to the accompanying drawings, and to the letters of reference marked thereon, which form a part of this specification.

The drawing, consisting of only one figure, represents our improvement.

One part of the invention consists in the combination, with the tube of an oil or other well, of a hollow cylindrical block of rubber or its equivalent, and devices for pressing this block against the wall of the well.

Another part of the invention relates to the construction of the devices employed for thus pressing the cylindrical block against the well.

A designates a well-tube placed in a well. The section of the tube which is placed in that part of the well where a packing is to be applied has a screw-thread cut on it, as seen in the drawing. B is a nut screwed up to the highest part, or nearly to the highest part, of the screw-thread, so that it will remain firmly in place. C is a washer or annular plate fitting loosely upon the tube next beneath the nut B. F is a nut working in the same screw-thread lower down on the tube, and having an upper flange or washer, E, which forms part thereof. Between the two washers we place any suitable packing which is capable of becoming expanded by being compressed between the two annular plates or washers.

In the example of our invention here given we have shown a packing made of a section of a hollow cylinder of gutta-percha.

One part of our invention relates to a novel construction of an oil-well packer, wherein a hollow yielding cylinder is mounted loosely upon an annular support attached to the eduction-tube and is forced against the wall of the well, said cylinder being formed of material a single piece of which encircles the eduction-tube concentric with, and immediately adjacent to, the said tubing, and detached from its supporting and compressing device, as distinguished from a packing like that shown and described in patent to J. R. Cross, No. 46,217, which consists of a mass of fibers extending longitudinally of the tubing and firmly attached to the lower supporting-flange, and also attached to and suspended from the upper flange, which forms part of the device employed for pressing the packing against the wall of the well, so as to prevent surface and other water from flowing into the lower part of the well. The packing, if it is a cylinder with unbroken sides, like that here shown, is applied before the lower nut and plate are placed on the tube. The diameter of the lower plate, E, is to be very nearly equal to the diameter of the well. In this example we have connected the lower nut and washer so as to form one piece; but they may be separate pieces, if desired, providing they are so applied as to move together.

The upper surface of the washer E, with which the gutta-percha cylinder D is in contact, is roughened or corrugated, so that it may take hold thereof by friction, and thereby the nut F be turned or held stationary with the cylinder.

The operation of the apparatus is as follows: The several parts being placed in their proper order on the well-tube, the tube is lowered into the well till the section which contains the packing-cylinder has reached the point where the latter is to be applied, when the tube is rotated. In the act of rotating the tube the packing-cylinder will be kept stationary by reason of frictional contact with the sides of the well, and which contact need only be slight, since the cylinder being held loosely between the nuts and washers, and the rotation of the tubing in the right direction will cause the nut F to ascend the screw-thread, and thereby compress the packing-cylinder D between the washers, and so increase its diameter. The continuation of this action will increase its diameter until it completely fills the annular space between the tube and the sides of the well, and thus make an effectual packing about the tube. The inner sides of the packing-cylinder will leave the sides of the well-tube when it is compressed between the washers, so that there will be no resistance produced by their contact to the rotation of the well-tube, and the cylinder may have that shape given to it in its normal condition—that is, its interior diameter may increase gradually from each end up to the middle of its length, so that little or no resistance shall be made on the tube to prevent its rotation in the well.

Any suitable material may be used for a packing-cylinder, such, for instance, as felt, leather, cloth, or other material which can be expanded or enlarged in its diameter, without departing from that part of our invention which relates to the employment of a packing material circular in form and surrounding the tubing—that is to say, with unbroken sides and not attached to the compressing-flanges—in combination with annular plates operated by screw-threads formed upon the eduction-tube for pressing the material against the wall of the well, in distinction from a packing made of strands of fiber which extend lengthwise of the eduction-tube, and are attached at their ends to the compressing-flanges, as in the patent to Cross, No. 46,217.

When the well-tube is to be removed from the well it is only necessary to rotate the well-tube in the opposite direction, when the nut F and its washer E will run down the screw-thread and the cylinder will resume its natural dimensions. The tube can then be withdrawn without difficulty or hinderance from the packing. For the upper nut, B, may be substituted a shoulder formed on the tube, or a strong collar may be shrunk thereon with a flange to take the place of the collar C, which latter we have here made loose to prevent friction. The lower nut, F, may be made of such enlarged diameter as to enable us to dispense with the flange or washer E.

We claim as new and desire to secure by Letters Patent—

1. In a packing for deep wells, the combination, with the eduction-tube, of a pressing device and a hollow cylinder, made of yielding material, encircling said eduction-tube, and mounted loosely between the two parts of the device which presses the cylinder against the wall of the well.

2. In an oil-well packer, a hollow cylindrical block, D, having the sides thinner near the center than at the end, substantially as set forth.

3. In an oil-well packer, an eduction-tube screw-threaded, a hollow cylindrical packing, D, and annular plates mounted on the screw-threaded tubing to press the packing against the wall of the well, substantially as set forth.

In testimony that we claim the foregoing we have hereunto set our hands this 29th day of April, 1878.

ALONZO H. FOWLER.
EDWARD JAY MORGAN.

Witnesses:
G. C. MOWRY,
H. G. NORTHRUP.